United States Patent [19]

Kumada et al.

[11] Patent Number: 4,833,390
[45] Date of Patent: May 23, 1989

[54] CHARGE COMPLETION DETECTOR

[75] Inventors: Akira Kumada; Michihiro Murata; Nobuhiro Itoh; Norimitsu Kitoh, all of Kyoto, Japan

[73] Assignee: Murata Manufacturing Co., Ltd., Japan

[21] Appl. No.: 253,765

[22] Filed: Oct. 5, 1988

[30] Foreign Application Priority Data

Oct. 5, 1987 [JP] Japan ................. 62-251346

[51] Int. Cl.⁴ .................. H02J 7/00; G01K 11/12
[52] U.S. Cl. .......................... 320/2; 320/35; 320/48; 340/636
[58] Field of Search ............. 320/2, 35, 36, 48; 340/636

[56] References Cited

U.S. PATENT DOCUMENTS 3,518,524  6/1970  Roszyk .................. 320/36 X
4,371,827  2/1983  Mullersman et al. ......... 320/48
4,417,782 11/1983  Clarke et al. ............. 320/35 X
4,727,006  2/1988  Malinowski et al. ........ 320/35 X Primary Examiner—R. J. Hickey
Attorney, Agent, or Firm—Ostrolenk, Faber, Gerb & Soffen

[57] ABSTRACT

A charge completion detector comprises a thermoelectric detecting element outputting a thermally generated electromotive force in correspondence with the rise of temperature incidental to the completion of charging a secondary cell, and detecting means electrically connected to the thermoelectric detecting element for detecting the thermally generated electromotive force generated in the thermoelectric detecting element. The thermoelectric detecting element comprises a base material of semiconductive ceramics and a plurality of pairs of electrodes formed spaced apart from each other by a prescribed distance on the base material for forming hot junctions and cold junctions. A heat radiating member is thermally coupled to the cold junctions of the base material. The temperature of the hot junction side thermally coupled to the secondary cell will be approximately the same as that of the secondary cell while the temperature of the cold junction side is kept at an environmental temperature. The rise of temperature is detected based on the change of the thermally generated electromotive force based on the difference between the temperatures of the hot junctions and cold junctions.

4 Claims, 5 Drawing Sheets

FET CHARACTERISTICS

CHARGE COMPLETION DETECTOR

BACKGROUND OF THE INVENTION

1. Field of the Invention

The present inveniton relates to a charge completion detector. More specifically, the present invention relates to a charge completion detector which detects the time of completion of charging of a secondary cell such as a Ni-Cd battery, lead-acid battery and the like, in which the change in temperature at the completion of charging of the secondary cell is detected utilizing Seebeck effect.

2. Description of the Prior Art

Detectors detecting changes of temperature during charging of secondary cells, detectors detecting the rise of temperature of the battery itself by attaching a thermistor and the like on the battery, and detectors detecting the pressure of gas generated at the final stage of charging in the battery box have been known as detectors of charging secondary cells such as Ni-Cd batteries.

However, these charge detectors cannot precisely detect the time of charge completion, because the rate of rise of temperature, the gas pressure and the voltage at charge completion of the battery are changed dependent on the temperature of the atmosphere surrounding the battery. If means for correcting fluctuation caused by the environmental temperature is provided, the time of charge completion can be precisely detected. However, it requires complicated processing circuits and portions for detecting the environmental temperature.

Detectors detecting the peak of changing voltage of the secondary cell in charging may possibly detect the completion of charging erroneously before the actual completion of charging, since the voltage of the secondary cell sometimes shows the peak immediately after the start of charging.

SUMMARY OF THE INVENTION

Therefore, an object of the present invention is to provide a charge completion detector having relatively simple structure capable of precisely detecting the time of charge completion regardless of the environmental temperature.

Briefly stated, the present invention comprises a thermoelectric detecting element outputting a thermally generated electromotive force corresponding to the rise of temperature incidental to the completion of charging of the secondary cell, and the detecting means is electrically connected to the thermoelectric detecting element to detect the thermally generated electromotive force generated in the thermoelectric detecting element. The thermoelectric detecting element comprises a base material formed of semiconductive ceramics, and at least a pair of electrodes arranged spaced apart by a prescribed distance on the base material forming a hot junction and a cold junction.

According to the present invention, the time of charge completion is detected based on the change of temperature of the secondary cell in consideration of the fact that the temperature rapidly rises at the final stage of charging. The temperature of the hot junction side thermally connected to the secondary cell will be approximately the same as that of the secondary cell, while the cold junction side is kept at the environmental temperature. Therefore the rise of temperature is detected based on the change of the thermally generated electromotive force caused by the difference of temperature of the hot junction side and the cold junction side. Therefore, the change of temperature at the time of charge completion of the secndary cell can be precisely detected regardless of the change of the environmental temperature.

In the preferred embodiment, a heat radiator is thermally coupled to the cold junction side of the base material. By providing such heat radiator, the temperature gradient between the hot junction and the cold junction side can be made steep, thereby providing larger detection output.

In a more preferred embodiment, the thermoelectric detecting element comprises a plurality of pairs of electrodes constituting a plurality of pairs of hot junctions and cold junctions, with each pair of electrodes connected in series.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First, the principle of measurement of the charge completion detector of the present invention will be described.

Figure 2:
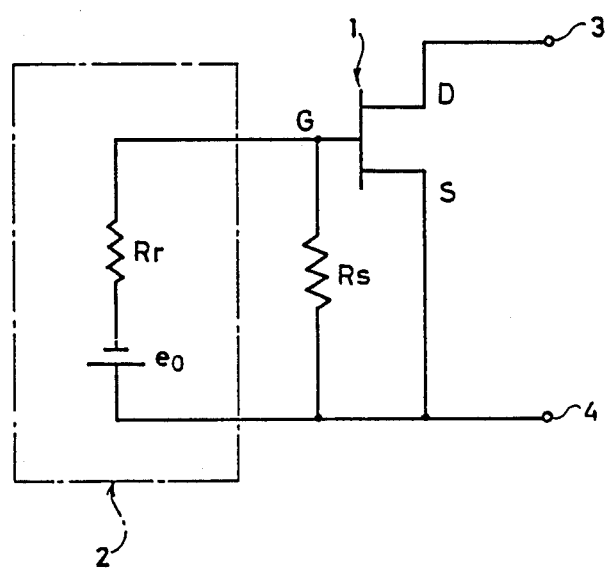
FIG. 2 is a circuit diagram of one embodiment of the present invention.

FIG. 2 is a circuit diagram of the detector of the present invention, with the portion surrounded by a chain dotted line showing an equivalent circuit of a thermoelectric detecting element 2 formed of semiconductive ceramics. As described above, the charge completion detector of the present invention comprises a thermoelectric detecting element and detecting means for detecting the thermally generated electromotive force generated in the thermoelectrically detecting element. In this embodiment, the detecting means is formed of a field effect transistor 1, and the thermoelectric detecting element 2 is connected between the gate terminal and the source terminal of the said field effect transistor 1. The thermally generated electromotive force in the thermoelectric detecting element 2 is taken out as an electric signal from the field effect transistor 1.

Figure 3:
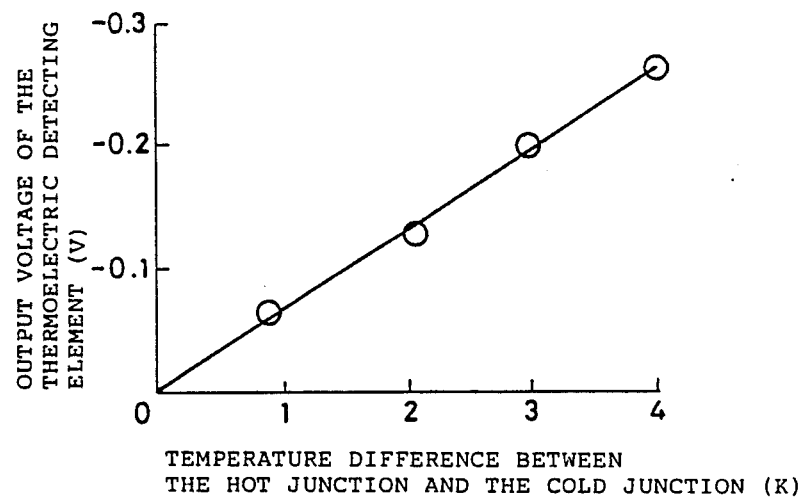
FIG. 3 is a graph showing the relation between the output voltage of the thermoelectric detecting element and the temperature difference between hot junction and cold junction.
Figure 4:
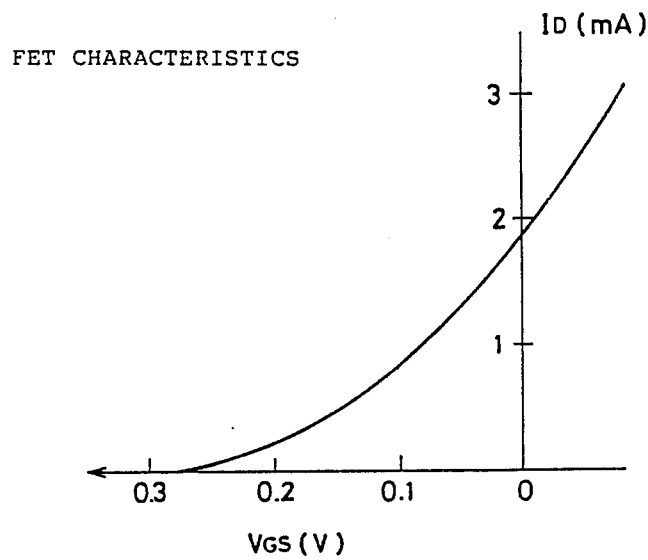
FIG. 4 is a graph showing characteristics of a field effect transistor.

The thermoelectric detecting element is formed of a base material of semiconductive ceramics on which electrodes are provided for forming a cold junction and a hot junction, respectively. The device is shown by the electromotive force $e_0$ and a series resistance Rr in FIG. 2. FIG. 3 shows the temperature difference input-output voltage characteristics of the thermoelectric detecting element. FIG. 4 shows the gate-source voltage $V_{Gs}$-drain current $I_D$ characteristics of the field effect transistor 1 shown in FIG. 2. As is apparent from FIGS. 3 and 4, when $V_{Gs}$ of the field effect transistor 1 is $-0.25V$, that is, when the temperature differences between the hot junction and the cold junction of the thermoelectric detecting element is about 4K, the drain current $I_D$ of the field effect transistor 1 becomes 0mA.

Figure 5:
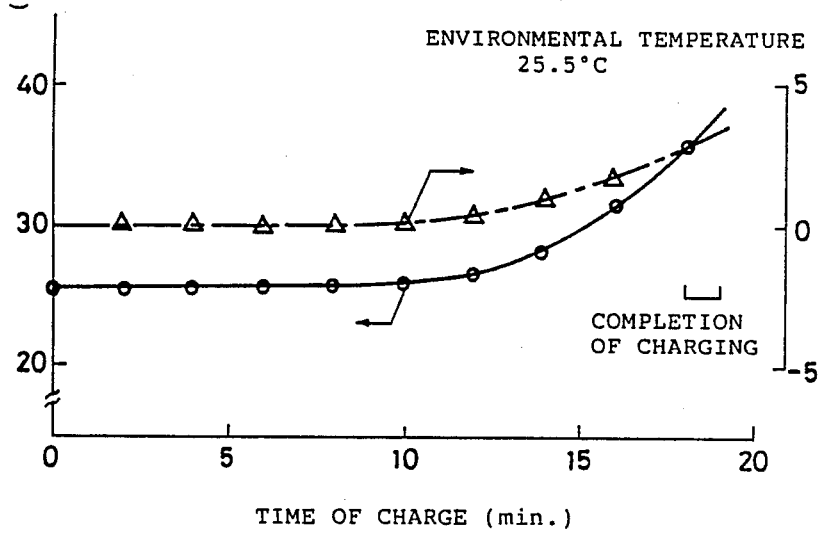
FIG. 5 is a graph showing the change of the battery temperature and the difference of temperature between the hot junction and cold junction in association with the charging time.

Meanwhile, the relation between the temperature of the secondary cell, the temperature difference between the cold junction and the hot junction of the thermoelectric detecting element and the time of charging is as shown in FIG. 5. As is apparent from the figure, the temperature difference between both junctions of the thermoelectric detecting element rises about 3K at the completion of charging, namely, 18 minutes after the start of charging.

Consequently, the output of the charge completion detector, that is, the drain current $I_D$ of the field effect transistor 1 becomes 0 about 20 minutes after the start of charging. Accordingly, the time of charge completion can be detected by the drain current $I_D$.

By selecting the $V_{Gs}$-$I_D$ characteristics of the field effect transistor 1 or by selecting the temperature difference between the hot junction and the cold junction output voltage characteristic of the thermoelectric detecting element, the time of detecting the charge completion can be changed. Namely, by appropriately selecting the characteristics of the field effect transistor 1 and the thermoelectric detecting element in correspondence with the change of the battery temperature in association with the time of charging such as shown in FIG. 5, the time of charge completion can be similarly detected. When a resistance ($R_s$ of FIG. 2) is connected between the gate and source of the field effect transistor 1, the output voltage of the thermoelectric detecting element can be divided and adjusted by using the internal resistance (Rr of FIG. 2) of the thermoelectric detecting element and the said resistance.

The thermoelectric detecting element can be equivalently represented by the electromotive force $e_O$ and the series resistance Rr as shown in FIG. 2. Therefore, when $e_O=0$, the gate terminal of the field effect transistor 1 is connected to the source terminal by the series resistance Rr, whereby the gate potential of the field effect transistor 1 becomes stable. A gate breakdown will be generated when $e_O<0$. In order to prevent the breakdown, a diode should be connected in the forward direction between the gate and source of the field effect transistor 1.

As described above, the present invention detects the time of charge completion using the thermally generated electromotive force based on the difference of temperature of the cold junction, which is approximately the same as the environmental temperature, and that of the hot junction, which is approximately the same as the temperature of the secondary cell, thermally coupled to the secondary cell. Therefore, the time of charge completion can be precisely detected irrespective of the change of the environmental temperature.

Figure 1:
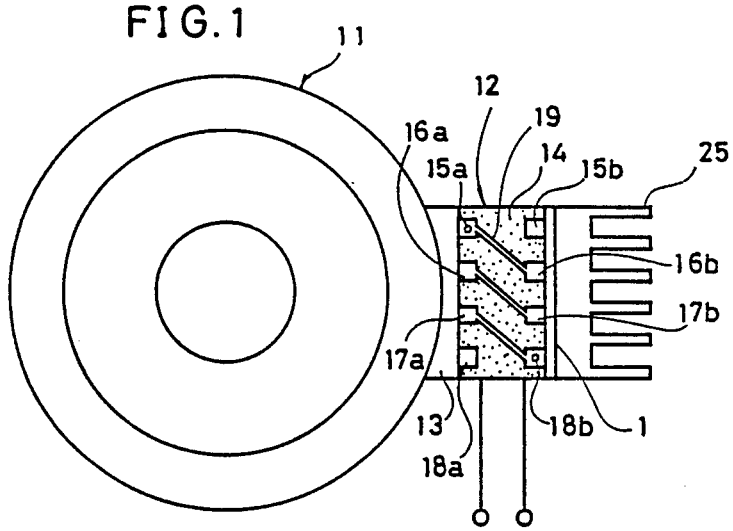
FIG. 1 is a schematic plan view of one embodiment of the present invention attached to a secondary cell.

A definite structure of one embodiment of the present invention will be described in the following. FIG. 1 is a plan view of the charge completion detector of the present embodiment applied on the secondary cell. More specifically, the charge completion detector 12 of this embodiment is thermally coupled to the box of the secondary cell 11 through a heat transmitting member 13 having superior heat conduction. Any material having superior heat conductivity may be used as the heat transmitting member 13. A material having superior heat conductivity and is capable of being closely adhered to the secondary cell 11 such as silicon labor with metal fillers dispersed therein is preferred.

The charge completion detector 12 is formed using a base material 14 of semiconductive ceramics, as shown in FIG. 1. Electrodes $15a \sim 18a$ and $15b \sim 18b$ forming pairs are arranged spaced apart by a prescribed distance on one main surface of the base material 14. The electrodes 15a and 15b constitute a pair, and similarly, the electrodes 16a to 18a and electrodes 16b to 18b constitute pairs, respectively. Accordingly, four pairs of electrodes are formed on one main surface of the base material 14, whereby 4 thermoelectric elements each having a hot junction and a cold junction are formed. In this embodiment, the electrodes $15a \sim 18a$ constitute hot junctions, while electrodes $15b \sim 18b$ constitute cold junctions.

The four thermoelectric elements are connected in series by connection conductive path 19. Consequently, a multistage-serially-connected type thermoelectric detecting element is provided in which four thermoelectric elements are connected in series.

Through-holes are formed at portions of the electrodes 15a and 18b, and the electrodes 15a and 18b are electrically connected to the other main surface of the base material 14 through the said through-holes.

Figure 6:
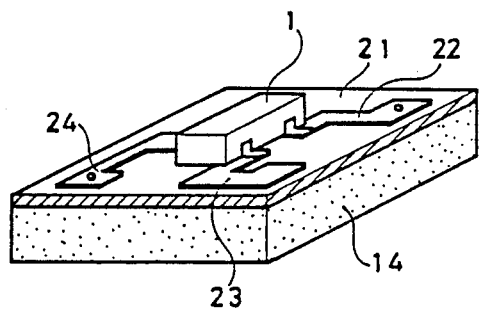
FIG. 6 is a perspective view of the charge completion detector of the embodiment shown in FIG. 1 viewed from the other main surface thereof.

An insulating layer 21 is formed on the other main surface of the base material 14 and conductive patterns 22 to 24 are formed on the insulating layer 21, as shown in FIG. 6. The conductive patterns 22 and 23 out of the patterns 22 to 24 are electrically connected to the above described through-holes. The conductive pattern 24 is electrically connected to the gate terminal of the field effect transistor 1 provided on the other main surface of the base material 14, and the conductive pattern 22 is electrically connected to the source terminal. The conductive pattern 23 is connected to the drain terminal of the field effect transistor 1. Therefore, the conductive patterns 22 and 23 correspond to the terminals 3 and 4 shown in FIG. 2.

Again referring to FIG. 1, a heat radiating member 25 is adhered to an end surface on the side opposite to the secondary cell 11, namely, on the side of the electrodes 15b to 18b constituting cold junctions of the charge completion detector 12 through an adhesive having superior heat conductivity. Since the heat radiating member 25 is adhered, the difference of temperature between the hot junction and the cold junction can be made larger in this embodiment, thereby providing larger detection output.

Figure 7:
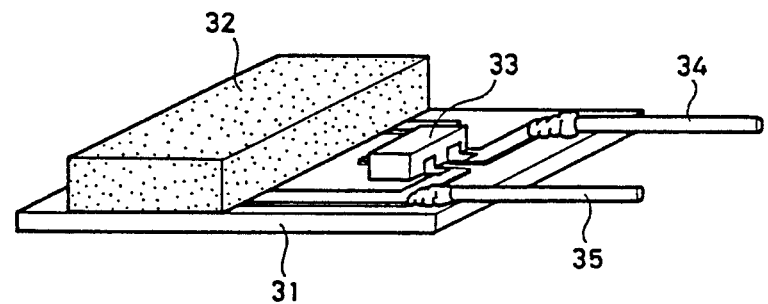
FIG. 7 is a perspective view showing another embodiment of the present invention.

The charge completion detector is not limited to that shown in FIGS. 1 and 6, and it may be formed using an insulating substrate 31 as shown in FIG. 7. In that case, a thermoelectric detecting element 32 formed of semiconductive ceramics and a field effect transistor 33 are mounted on the insulating substrate 31. Output terminals 34 and 35 are drawn out from the insulating substrate 31.

Figure 8:
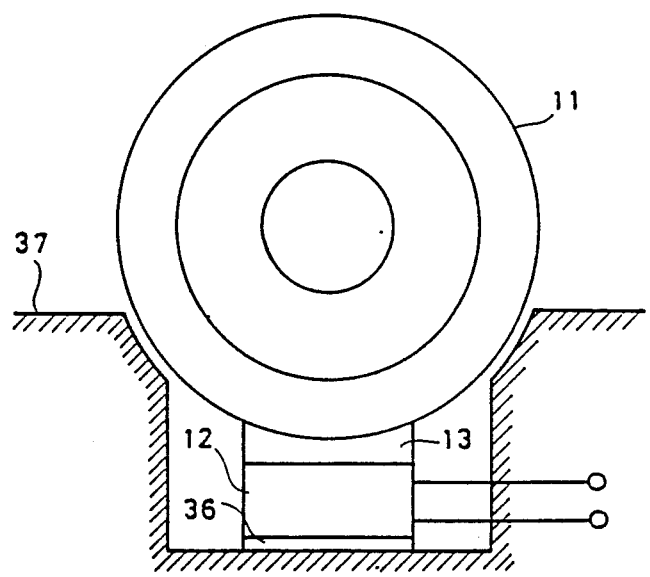
FIG. 8 is a schematic plan view showing an example in which the box of the device is used as the heat radiator.

The heat radiating member may not necessarily be directly adhered to the charge completion detector 12 as shown in FIG. 1, but it may be thermally coupled to the box 37 of the device through an elastic body having superior heat conductivity, so that the box 37 itself of the device is used as the heat radiating member, as shown in FIG. 8.

Figure 9:
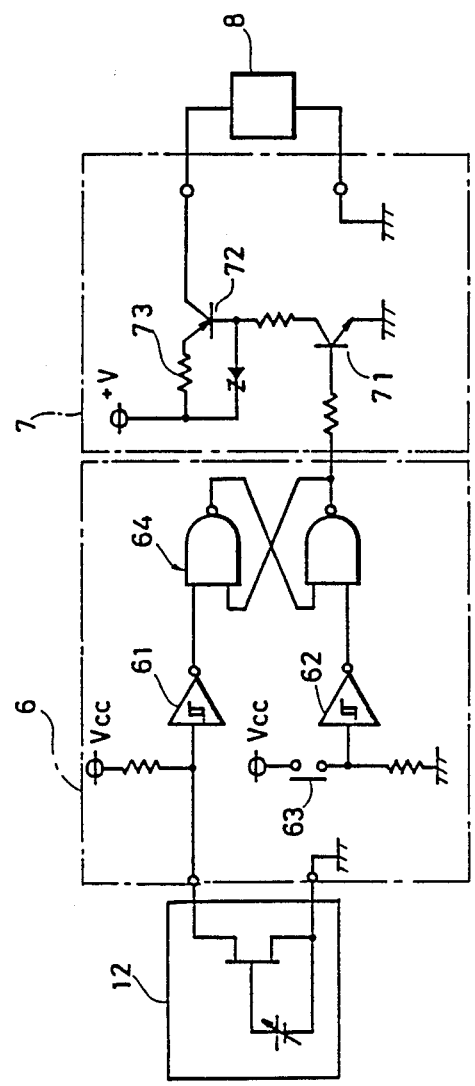
FIG. 9 is a circuit diagram of a charger incorporating the charge completion detector of the present invention.

FIG. 9 is an example of a charger employing the charge completion detector of the present invention. Referring to FIG. 9, the charge completion detector 12 of the present invention is connected to a charge control portion 6. The charge control portion 6 comprises an inverter 61 receiving outputs from the charge completion detector 12; a flip-flop 64 which is reset upon reception of the output from the inverter 61; a charge start switch 63; and an inverter 62 for setting the flip-flop 64 upon reception of the output of the charge start switch 63. A constant current charging portion 7 comprises transistors 71 and 72, with a set output of the flip-flop 64 being applied to the base of the transistor 71. The collector of the transistor 71 is applied to the base of the transistor 72, and a power supply +V is applied to the emitter of the transistor 72 through a resistance 73. A secondary cell 8 is connected to the connector of the transistor 72.

When the charge start switch 63 is turned on in the charger structured as described above, the flip-flop 64 is set through the inverter 62, the transistor 71 becomes conductive, and therefore the transistor 72 also becomes conductive, and the power supply +V is supplied to the secondary cell 8. When the secondary cell 8 is charged and the change of temperature at the time of charge completion is detected by the charge completion detector 12, the flip-flop 64 is reset through the inverter 61, transistors 71 and 72 become non-conductive, the supply of the power supply +V to the secondary cell is stopped, and therefore the charging operation can be automatically stopped simultaneously with the completion of charging.

As described above, according to one embodiment of the present invention, the hot junction side of a thermoelectric detecting element formed of a material of semiconductive ceramics is thermally coupled to a secondary cell to detect the time of charge completion of the secondary cell based on the temperature difference between the hot junction side and the cold junction side, the time of charge completion can be precisely detected independent from the influence of the environmental temperature. Consequently, the completion of charging can be precisely detected without the need of providing complicated detecting elements and circuits for correcting the fluctuation of the environmental temperature.

The present invention may be applied to detect the time of charge completion of various secondary cells as well as the Ni-Cd cell.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A charge completion detector detecting completion of charging of a secondary cell, comprising:
    a thermoelectric detecting element having a thermoelectric element including a base material of semiconductive ceramics and at least a pair of electrodes formed spaced apart by a prescribed distance on said substrate to form a hot junction and a cold junction, with said hot junction side thermally coupled to said secondary cell to output a thermally generated electromotive force corresponding to a change of temperature incidental to charge completion of said secondary cell; and
    detecting means electrically connected to said thermoelectric detecting element to detect the thermally generated electromotive force generated in said thermoelectric detecting element.

2. A charge completion detector according to claim 1, further comprising:
    heat radiating member thermally coupled to the cold junction side of said base material.

3. A charge completion detector according to claim 1, comprising
    a heat transmitting member provided between the hot junction of said base material and said secondary cell to transmit the change of temperature of said secondary cell to said hot junction.

4. A charge completion detector according to claim 1, wherein
    said thermoelectric detecting element comprises a plurality of pairs of electrodes for forming a plurality of hot junctions and cold junctions, with each pair of electrodes connected in series.

* * * * *